US010596634B2

(12) United States Patent
Forsberg et al.

(10) Patent No.: US 10,596,634 B2
(45) Date of Patent: Mar. 24, 2020

(54) CUTTING TOOL WITH A NOZZLE WITH A COOLANT CHANNEL

(71) Applicant: SECO TOOLS AB, Fagersta (SE)

(72) Inventors: Svante Forsberg, Fagersta (SE); Mats Jonsson, Hedemora (SE); Jimmy Thelin, Fagersta (SE); Andreas J. Larsson, Arboga (SE); Tony Sunden, Fagersta (SE); Jonas Thuresson, Fagersta (SE)

(73) Assignee: SECO TOOLS AB, Fagersta (SE)

( * ) Notice: Subject to any disclaimer, the term of this patent is extended or adjusted under 35 U.S.C. 154(b) by 0 days.

(21) Appl. No.: 15/738,768

(22) PCT Filed: Jun. 2, 2016

(86) PCT No.: PCT/SE2016/050522
§ 371 (c)(1),
(2) Date: Dec. 21, 2017

(87) PCT Pub. No.: WO2017/003342
PCT Pub. Date: Jan. 5, 2017

(65) Prior Publication Data
US 2018/0161885 A1 Jun. 14, 2018

(30) Foreign Application Priority Data

Jun. 30, 2015 (EP) .................................... 15174654
Jun. 30, 2015 (EP) .................................... 15174661

(51) Int. Cl.
*B23B 27/10* (2006.01)
*B23B 51/06* (2006.01)
*B23C 5/28* (2006.01)

(52) U.S. Cl.
CPC .............. *B23B 27/10* (2013.01); *B23B 51/06* (2013.01); *B23C 5/28* (2013.01); *B23B 2260/072* (2013.01)

(58) Field of Classification Search
CPC . B23B 27/10; B23B 2231/24; B23B 2250/12; B23C 5/28; B23C 2250/12
See application file for complete search history.

(56) References Cited

U.S. PATENT DOCUMENTS 4,848,198 A 7/1989 Royal et al.
6,299,388 B1 10/2001 Slabe
(Continued)

FOREIGN PATENT DOCUMENTS

EP 0656239 A1 6/1995
JP 406023648 A 2/1994
(Continued)

*Primary Examiner* — Alan Snyder
(74) *Attorney, Agent, or Firm* — Corinne R. Gorski

(57) ABSTRACT

The present disclosure relates to a tool having a holder body, a cutting insert and a nozzle. The nozzle includes a single through hole for a fastening member. The nozzle has a forward end, a rear end and a bottom face. The through hole extends between the bottom face and an opposite top face. At least one internal coolant channel is provided in the nozzle and extends from a first opening to a second opening. The first opening connects to a coolant supply conduit in the holder body. The second opening serves as an exit for the coolant at the forward end. The at least one coolant channel and the first opening are spaced from the through hole.

15 Claims, 13 Drawing Sheets

(56) References Cited

U.S. PATENT DOCUMENTS

| | | |
|---|---|---|
| 2006/0140728 A1 | 6/2006 | Giannetti |
| 2007/0283794 A1 | 12/2007 | Giannetti |
| 2007/0286689 A1 | 12/2007 | Giannetti |
| 2011/0305531 A1 | 12/2011 | Amstibovitsky et al. |
| 2011/0311323 A1 | 12/2011 | Hecht |
| 2013/0051934 A1* | 2/2013 | Henry .................... B23B 27/10 407/11 |
| 2014/0294520 A1* | 10/2014 | Henzler ............. B23B 27/1625 407/11 |
| 2014/0334887 A1 | 11/2014 | Flolo |
| 2015/0273589 A1* | 10/2015 | Hoffer .................... B23B 27/10 407/11 |

FOREIGN PATENT DOCUMENTS

| | | |
|---|---|---|
| WO | 2006077363 A1 | 7/2006 |
| WO | 2011154933 A1 | 12/2011 |

\* cited by examiner

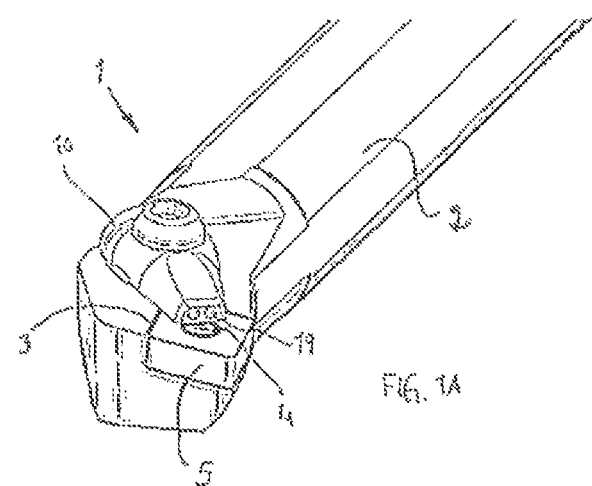
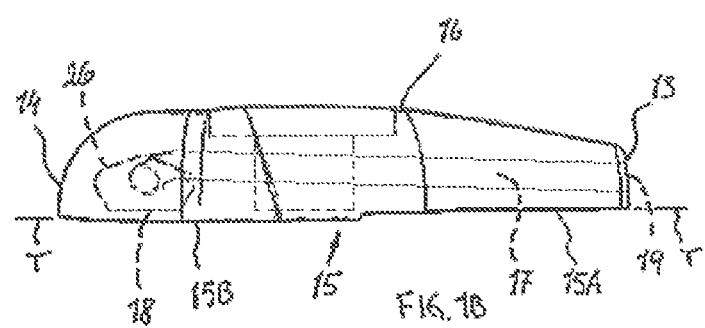

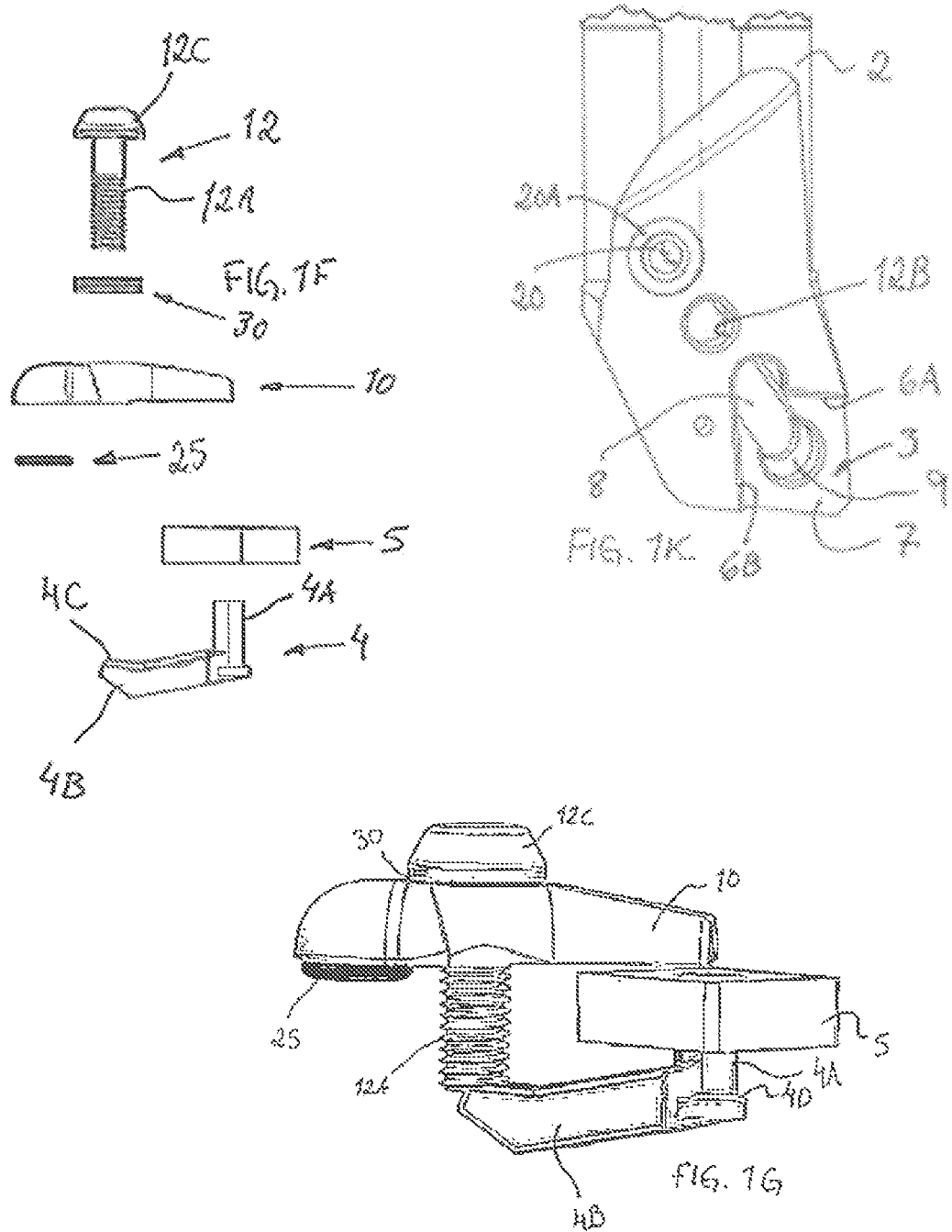

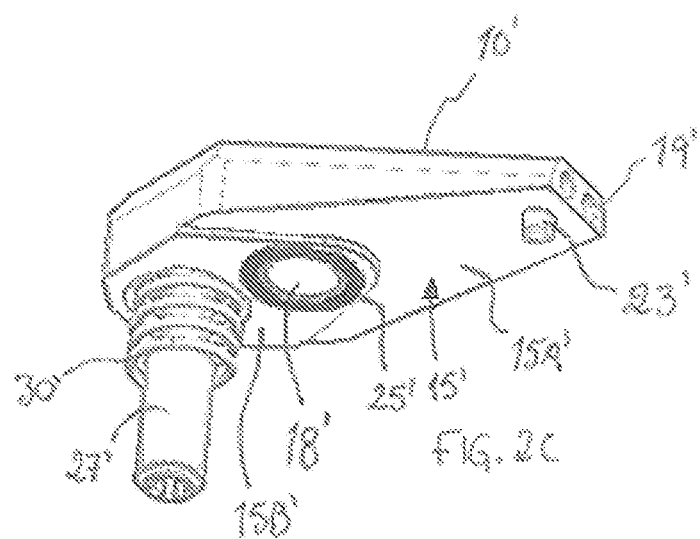
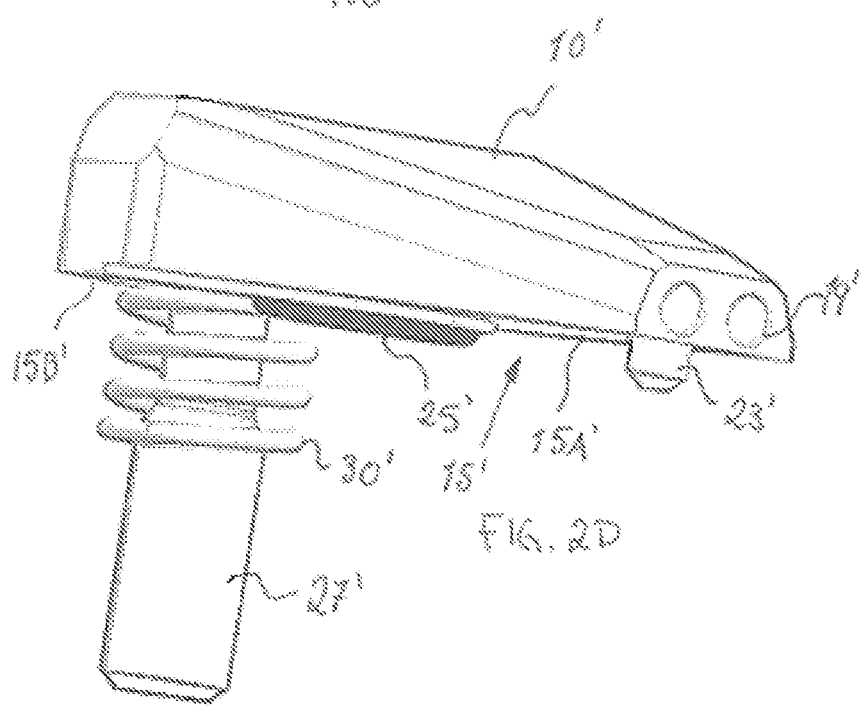

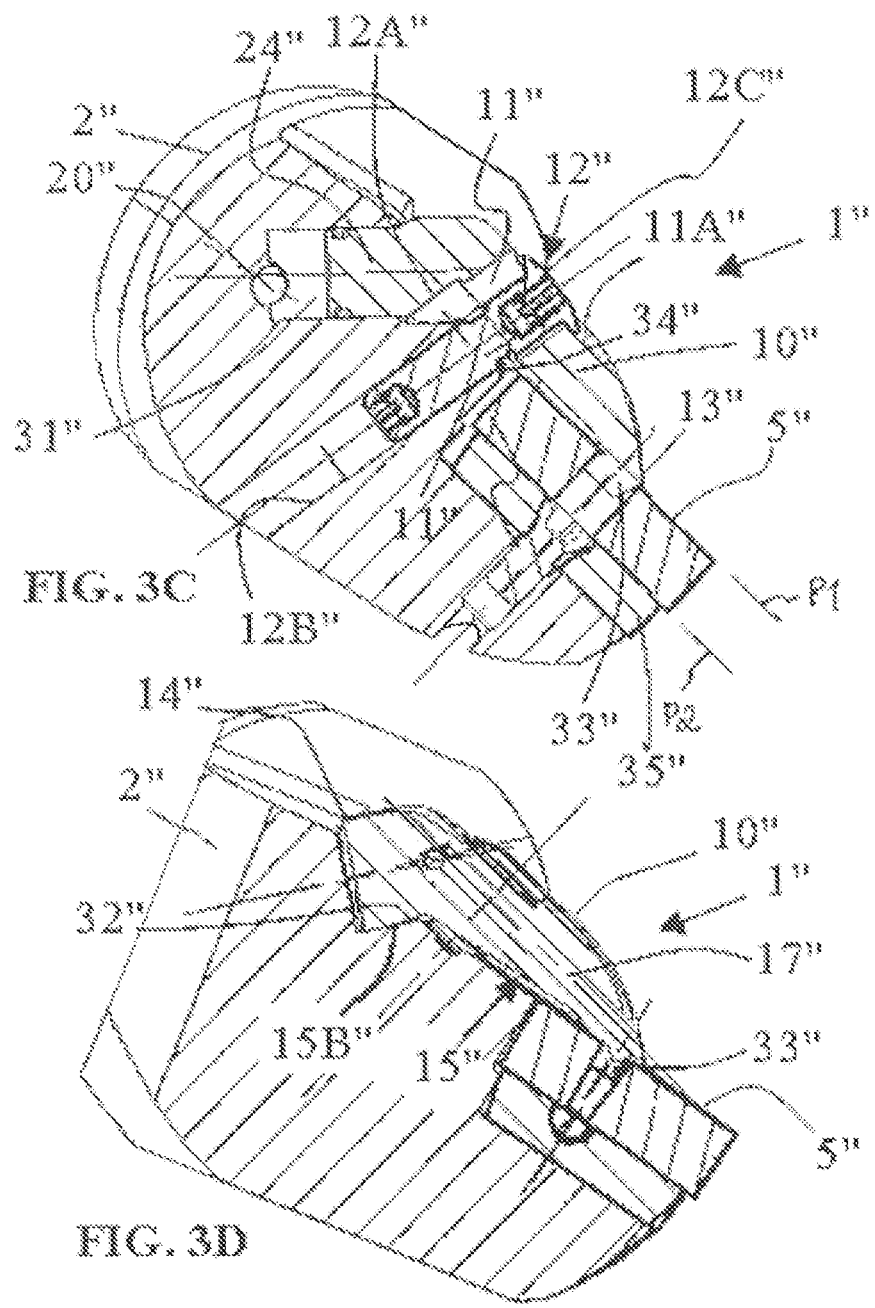

CUTTING TOOL WITH A NOZZLE WITH A COOLANT CHANNEL

RELATED APPLICATION DATA

This application is a § 371 National Stage Application of PCT International Application No. PCT/SE2016/050522 filed Jun. 2, 2016 claiming priority to EP Application Nos. 15174654.2 and 15174661.7, each filed Jun. 30, 2015.

FIELD OF THE INVENTION

The present invention relates to a cutting tool for metal chip removing machining and, more particularly, to such cutting tools having coolant flow channels.

BACKGROUND AND SUMMARY

It is advantageous to deliver a coolant closely to a cutting area, using a cutting tool having a coolant supply, directing a coolant to a cutting edge of the cutting insert for minimizing the heat accumulated due to the interaction of a cutting insert with a machined workpiece. Conventional techniques for providing lubrication and/or coolant to cutting edges of cutting inserts typically involve introducing the coolant via openings in a toolholder for the cutting insert, or via spray nozzles directed at the cutting edges such as U.S. Pat. No. 4,848,198. Some cutting inserts include channels formed in the cutting inserts that are in flow communication with and facilitate introduction of coolant from channels provided in the toolholder body. The provision of these coolant flow channels in the cutting inserts tends to substantially complicate manufacture of the cutting inserts, and the channels can weaken the cutting insert.

EP 2 789 415 A1, EP 0 656 239 A1 and US 2011/311323 A1 show various cutting tools having coolant conduits.

It is desirable to provide a cutting tool that facilitate introduction of coolant to the cutting edges of the cutting insert that minimizes manufacturing complexity. It is also desirable to provide a cutting tool that facilitate introduction of coolant to the cutting edge without substantially interfering with the strength of the cutting insert.

SUMMARY OF THE INVENTION

According to an aspect of the present invention, a tool comprises a holder body, a cutting insert and a nozzle, said nozzle having a single through hole for a fastening member, said nozzle having a forward end, a rear end and a bottom face, said through hole extending between the bottom face and an opposite top face, at least one internal coolant channel being provided in the nozzle and extending from a first opening to a second opening, said first opening connecting to a coolant supply conduit in the holder body, said second opening serving as exit for the coolant at the forward end, wherein the at least one coolant channel and the first opening are spaced from the through hole to avoid interference therewith.

According to another aspect of the present invention, the nozzle has a longitudinal axis that intersects the through hole to be able to function as a lever, and the nozzle exhibits mirror symmetry about a plane containing a longitudinal axis of the nozzle to increase versatility.

According to another aspect of the present invention, the first opening is located at a portion of the bottom face, said portion projecting such that a tangent to the bottom face perpendicular to a through hole axis intersects the first opening to thereby make sure the first opening is positioned close to the coolant supply conduit.

According to another aspect of the present invention, the nozzle is a removable nozzle for turning applications where coolant cools the cutting insert and the tool comprises means to coolant-tightly seal the nozzle relative to the holder body to avoid leakage of coolant.

According to another aspect of the present invention, the at least one coolant channel follows a smooth path without sudden directional changes thereby enhancing coolant flow.

According to another aspect of the present invention, at least a first portion of the coolant channel transits mathematically smooth into a second portion of the coolant channel, such that the first and second portions of the coolant channel are continuous thereby further enhancing coolant flow.

According to another aspect of the present invention, there are two coolant channels extending at opposite sides of the through hole thereby facilitating increase in coolant flow while keeping the nozzle sturdy.

According to another aspect of the present invention, the first opening is situated between the through hole and the rear end to make more space for fastening means.

According to another aspect of the present invention, the first opening is situated between the through hole and the forward end to reduce space requirements for the tool.

According to another aspect of the present invention, the bottom face of the nozzle comprises a guide device such as a projection or recess adjacent to the forward end to set the direction of the nozzle by having the guide device cooperating with a recess or projection on a cutting insert or clamping means.

According to another aspect of the present invention, the rear end connects to a cylindrical heel protrusion carrying the first opening for creating pull of the nozzle in the holder body.

According to another aspect of the present invention, the coolant channel or the first opening is surrounded by a seal such as an O-ring.

According to another aspect of the present invention, the nozzle is a one-piece unit preferably made through additive manufacturing, such that it has no plugged holes.

According to another aspect of the present invention, the fastening member is a screw which extends along a hole in the holder body, said screw being intersected by upper and lower imaginary planes of the cutting insert.

According to another aspect of the present invention, the nozzle bottom face is spaced from the cutting insert in assembled state such that the nozzle may be guided in a desired direction.

According to another aspect of the present invention, the nozzle acts as a clamp pressing against a part of the cutting insert.

According to another aspect of the present invention, a single fastening member or screw secures both the cutting insert and the nozzle.

BRIEF DESCRIPTION OF THE DRAWINGS

The features and advantages of the present invention are well understood by reading the following detailed description in conjunction with the drawings in which like numerals indicate similar elements and in which:

FIG. 1A is a perspective view of a cutting tool according to an aspect of the present invention;

FIG. 1B is a side view of a nozzle of the cutting tool in FIG. 1A;

FIG. 1F is an exploded side view of components including the nozzle of FIGS. 1B-1E of the cutting tool according to an aspect of the present invention;

FIG. 1G is a side view of the components;

FIG. 1H is a bottom view of the components;

FIG. 1I is a front view of the components;

FIG. 1K is a top view of a holder body of the cutting tool in FIG. 1A;

FIG. 2C is a perspective view from below of a nozzle, a spring and fastening means shown in FIG. 2A:

FIG. 2D is a perspective side view of the nozzle, the spring and the fastening means shown in FIG. 2A:

FIG. 3C is a cross-sectional view along line C-C in FIG. 3A;

FIG. 3D is a cross-sectional view along line D-D in FIG. 3A;

Figure 1C:
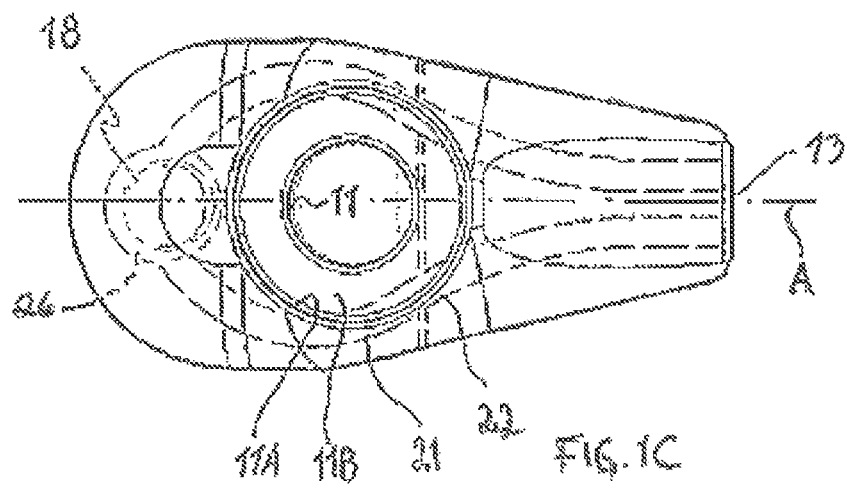
FIG. 1C is a top view of the nozzle.
Figure 1D:
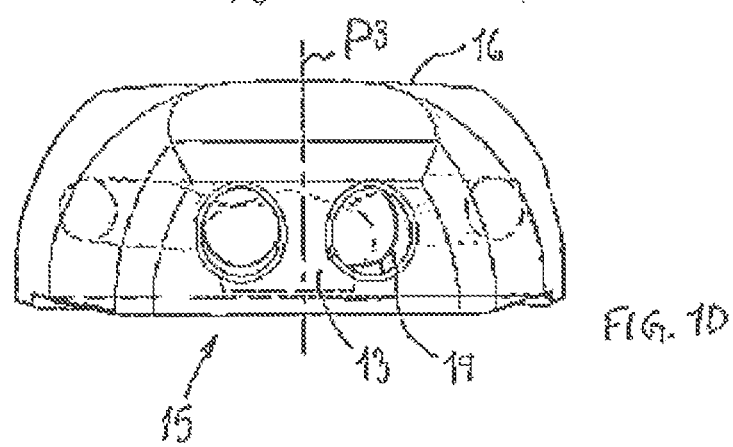
FIG. 1D is a front view of the nozzle.
Figure 1E:
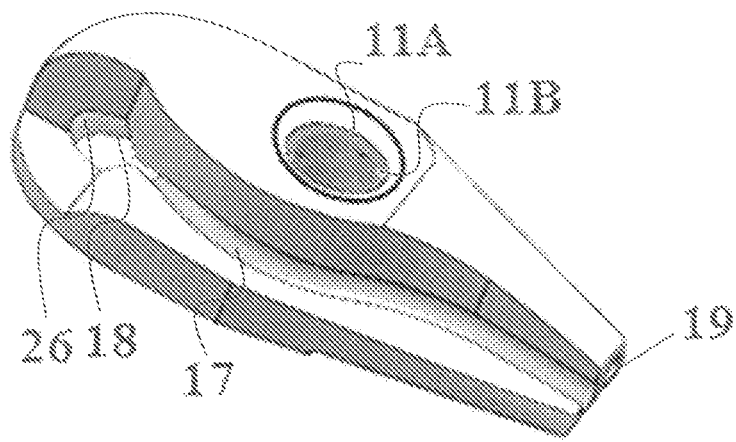
FIG. 1E is a perspective front view of the nozzle, partially in section.
Figure 1J:
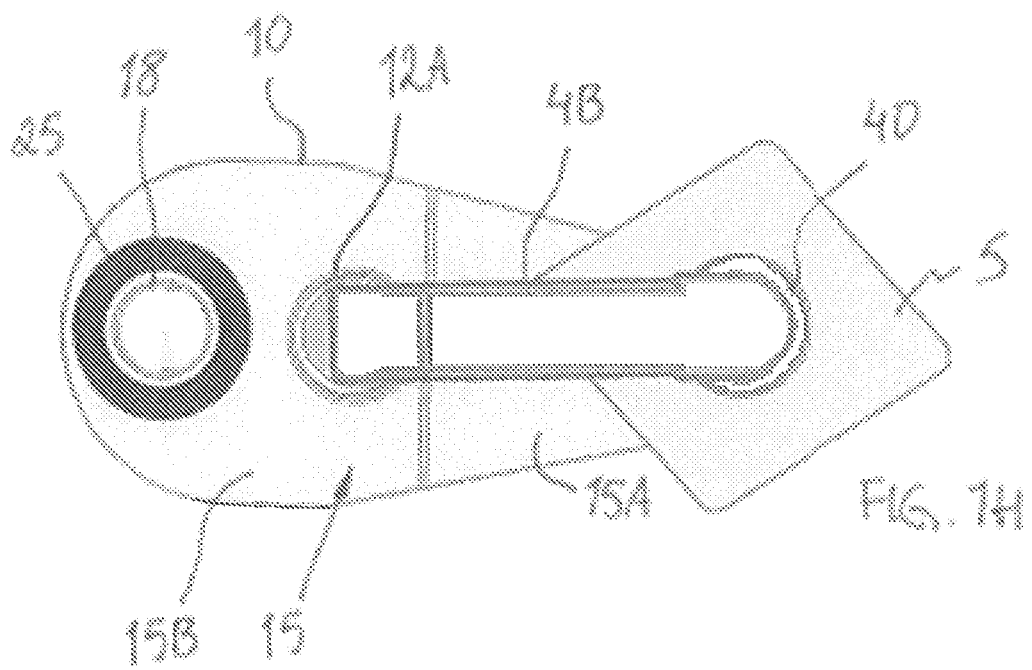
FIG. 1J is a side view and top view of a spring included in the components.
Figure 1J:
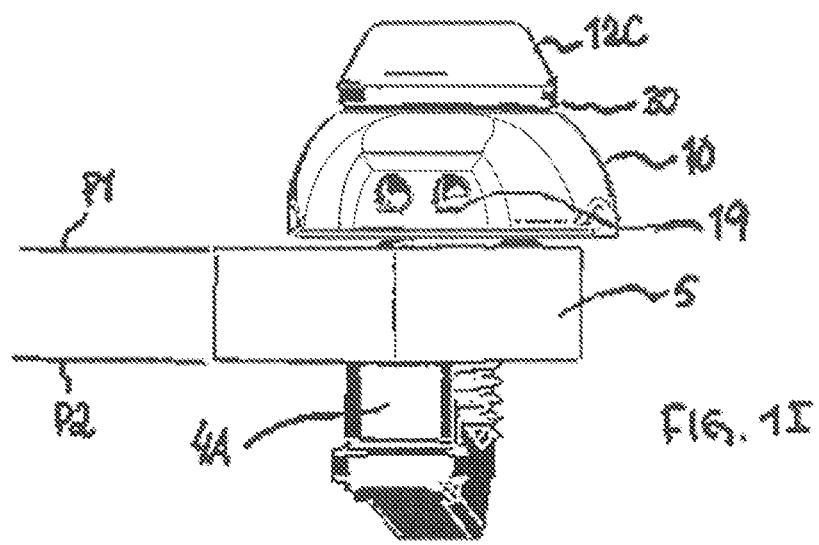
Figure 1J:
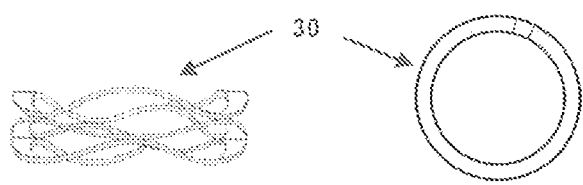

The FIGS. 1B, 1C, 1D and the FIGS. 2A, 2E, 2H, 2J, 2K and 2L have been depicted by at least partly transparent illustrations for ease of understanding. It is however understood that the tools themselves are not transparent.

DETAILED DESCRIPTION

Reference is made to FIGS. 1A-1K showing a cutting tool 1 in accordance with the present invention. The shown cutting tool 1 may be a turning tool for internal metal machining and comprises a holder body 2 having a pocket 3, a clamping means in the shape of a locking member 4 and an inducer or nozzle 10. The pocket 3 is conventional and may have a bottom surface 7 and two upstanding walls 6A and 6B. The bottom surface 7 may have a recess 8 to accommodate the locking member 4. The bottom surface may be provided with a removable shim, not shown. The recess 8 is key lock shaped in top view, e.g. a combination of a circle and a rectangle, and may have a ledge 9 below about a center of the bottom surface 7. The indexable cutting insert 5 is clamped in the pocket by means of an L-shaped locking member 4 projecting into a hole of the cutting insert. In the illustrated embodiment, the cutting insert and pocket are generally diamond in shape but may have other shapes. The L-shaped locking member urges the converging sides of the cutting insert 5 against upstanding walls 6A and 6B, which are of substantially complementary shape to the sides of the cutting insert. The locking member forms one leg 4B of an L-shape pivotally arranged in the recess 8 in the holder 2, the other leg 4A of which member extends through a hole of the cutting insert 5. The locking member may have a rim 4D which rests upon the ledge 9 in the recess 8. Actuating means or fastening means 12 is provided to move the leg 4B downwardly and by this cause a pivoting action of the locking member around an axis and about a fulcrum point of the rim 4D and the ledge 9. The said axis forms substantially a right angle with the direction in which the leg 4B extends. In the illustrated embodiment, the means 12 is in the form of a screw 12A threadably engaged in a hole 12B in the holder 2. The screw 12A may have a single threaded end portion and may have an end portion arranged to engage the free end 4C of the leg 4B of the L-shaped locking member 4, when the screw 12A is turned, to cause said pivoting action of the locking member around the fulcrum point formed in the holder 2. The leg 4A passes through the recess 8 in the holder, the opening being shaped and dimensioned so as not to impede desired pivotal movement of the legs. The locking member leg 4A extends into a central hole in the cutting insert and serves to detachably secure the cutting insert in the pocket 3. The pivotal movement of the leg 4A causes the cutting insert 5 to move towards the walls 6A and 6B and be clamped thereto.

The screw 12A may extend along a hole 12B in the holder body 2. The screw is intersected by upper (P1) and lower (P2) imaginary planes of the cutting insert. The planes P1 and P2 may be parallel and each plane may touch at least two, preferably three or four, corner portions of the upper and lower surface of the cutting insert, respectively. The nozzle 10 exhibits mirror symmetry about a first plane P3 containing a longitudinal axis A of the nozzle as can be seen, for example, in FIG. 1C. The nozzle may be a one-piece unit. The nozzle includes a forward end 13, a rear end 14 and a bottom face 15. The bottom face 15 comprises a first surface 15A and a second surface 15B, the first surface being generally recessed relative to the second surface. A single through hole 11 extends between the bottom face 15 or the second surface 15B and an opposite top face 16. The single through hole 11 may be surrounded by an enlarged cavity 11A at the top face 16. At least one internal coolant channel 17 is provided in the nozzle that extends from a first opening 18 to a second opening 19, and is preferably not having any strength reducing or plugged holes such as stop screws in holes. By the expression "internal coolant channel" is here primarily meant self-contained channels where the walls of the channel are within the nozzle. The first opening 18 is connectable to the coolant supply conduit 20 in the holder body. The first opening 18 is located at the second surface 15B of the bottom face 15. The second surface 15B projects such that a tangent T to the first surface 15A facing the cutting insert 5, and perpendicular to a through hole axis intersects the first opening or the channel 17. The first opening 18 is positioned between the through hole 11 and the rear end 13 and may comprise a chamber 26 in flow communication with the second opening 19. The second opening 19 serves as exit for the coolant at the forward end 13. The at least one coolant channel 17 and the first opening 18 are spaced from, i.e. not in contact with the through hole 11. The at least one coolant channel 17 may follow a smooth path without sudden directional changes such that coolant flow is not obstructed. At least a first portion 21 of the coolant channel 17 transits mathematically smooth or continuous into a second portion 22 of the coolant channel. The first and second portions of the coolant channel are designed such that first derivatives thereof are continuous if their lower peripheries are seen as mathematical curves for example as in the top view of FIG. 1C. Thereby, there will be reduced risk for oil traps when using oil mist as coolant.

Suitably, the nozzle 10 is made through precision casting or additive manufacturing such as metal 3D printing processes which use binders, or fully dense metal processes like selective laser sintering (SLS) or direct metal laser sintering (DMLS). The latter technology uses a high power laser to fuse small particles of metal powders into a nozzle that has the described three dimensional shape. The laser selectively fuses the powdered metal by scanning the cross-sections (or layers) generated by a three dimensional modeling program on the surface of a powder bed. After each cross-section is scanned, the powder bed is lowered by one layer thickness. Then a new layer of material is applied on top and the process is repeated until the nozzle is completed.

The nozzle 10 can be held to the holder body by the fastening member 12, preferably by the screw 12A. The single through hole 11 receives the fastening member 12 carrying a spring 30 and that is threadedly secured to a hole 12B in the holder body. The cavity 11A bottom 11B is intended to serve as a seat for the spring 30, such as a multiwave compression spring of for example stainless steel. Multiwave compression springs may be used in applications where space problems in length preclude the option of using a normal compression spring. The spring 30 is more closely shown in FIG. 1J. Other spring means can be used such as rubber washers. The nozzle does not have a front projection to engage a wall of the through hole of the cutting insert. The coolant is led through conduits passing through the holder body and requires connecting passageways and a deformable seal to lead the coolant to a discharge exit 19.

The fastening member 12 may have a head 12C which has an underside that can act on the spring 30 and urge the nozzle towards the holder. A seal element 25, such as an O-ring may be secured to or be loosely held by the nozzle or be secured to or be loosely held by a concave cavity 20A surrounding the conduit 20 opening in the holder body 2. The seal element 25 may be compressed between the nozzle and the holder body during the tightening of the fastening member to coolant-tightly seal the conduit 20 opening.

At mounting of the cutting insert 5 to the holder body 2 the locking member 4 sits in the recess 8 by interaction of the rim 4D and the ledge 9 in a conventional manner. The screw 12A is passed through the spring means 30 and the nozzle hole 11 and threaded through the hole 12B in the holder body 2. Suitably, the nozzle is rotated about the screw 12 to a position where it does not interfere with the space needed to mount the cutting insert. The end of the screw 12A will abut against the leg 4B and thereby cause pivotal movement of the leg 4A. If a cutting insert 5 is mounted in the pocket 3 the leg 4A will urge the cutting insert in direction towards the upstanding walls 6A and 6B. The nozzle is rotated about the screw into desired position when the cutting insert has been mounted. The screw head 12C will act on the spring means 30 and force the nozzle in direction towards the holder body. By choosing the correct elasticity property for the spring means 30 and the correct direction of the nozzle, the nozzle will become clamped against the holder body via the interaction of the seal 25 and the concave cavity 20A. The nozzle first surface 15A is spaced from, i.e. not in contact with the cutting insert 5 in assembled state. The holder body and/or the nozzle may be provided with means to guide the nozzle to a desired direction, such as protrusions acting peripherally on the nozzle or at least one protrusion acting in the forward end of the nozzle acting centrally on the cutting insert. The nozzle in this embodiment is not meant to clamp on the cutting insert but can do so if for example a thicker O-ring is used instead of the O-ring 25 shown. In the latter case the nozzle will tilt about an axis perpendicular to the length axis A and the forward end thereof will contact the cutting insert.

In use the shown tool will be turning metal workpieces while coolant may flow in order through the holder body 2, the coolant supply conduit 20, the seal 30, the fluid channel 17 and from the exit 19 to at least one active cutting edge.

Stated another way, a single fastening member 12 or screw 12A secures both the cutting insert 5 and the nozzle 10.

FIGS. 2A to 2L show a cutting tool 1' according to an aspect of the present invention. The shown cutting tool may be a turning tool for internal metal machining and comprises a holder body 2' having a pocket 3', a clamping means in the shape of a locking member 4' and an inducer or nozzle 10'. The pocket 3' is conventional and may have a bottom surface 7' and two upstanding walls 6A' and 6B'. The bottom surface 7' may have a recess 8' to accommodate the locking member 4'. The bottom surface may be provided with a removable shim, not shown. The recess 8' is key lock shaped in top view, e.g. a combination of a circle and a rectangle, and may have a ledge 9' below about a center of the bottom surface 7'. The recess 8' may extend only below the upstanding wall 6B' to avoid interfering with any desired space for a coolant supply conduit 20'. The indexable cutting insert 5' is clamped in the pocket by means of an L-shaped locking member 4' projecting into a hole of the cutting insert. In the illustrated embodiment, the cutting insert is generally of rhombic shape. The L-shaped locking member urges a side of the cutting insert 5' initially against the upstanding wall 6B', and then against the upstanding wall 6A', both of which are of substantially complementary shape to the sides of the cutting insert. The locking member has one leg 4B' of the L-shape pivotally arranged in the recess 8' in the holder 2', the other leg 4A' of which member extends through the hole of the cutting insert 5'. A free end of the leg 4A' has a recess 29', such as a blind hole. The locking member may have a rim 4D' which rests upon the ledge 9' in the recess 8. Actuating means or fastening means 12' is provided to move the leg 4B' downwardly and by this cause a pivoting action of the locking member around an axis and about a fulcrum point of the rim 4D' and the ledge 9'. The said axis forms substantially a right angle with the direction in which the leg 4B' extends. In the illustrated embodiment, the means 12' is in the form of a screw 12A' threadably engaged in a hole 12B' in the holder 2'. The screw 12A' may have a single threaded end portion and may have an waist portion 12D' arranged to receive the free end 4C' of the leg of the L-shaped locking member 4', when the screw 12A' is turned, to cause said pivoting action of the locking member around the fulcrum point formed in the holder 2'. The leg 4B' passes through the recess 8' in the holder, the opening being shaped and dimensioned so as not to impede desired pivotal movement of the legs. The locking member leg 4A' extends into the central hole of the cutting insert and serves to detachably secure the cutting insert in the pocket 3'. The pivotal movement of the leg 4A' causes the cutting insert 5' to move towards the walls 6A' and 6B' and be clamped thereto. The screw 12A' may extend along an at least partly threaded hole 12B' in the holder body 2'. The screw may be intersected by upper and lower imaginary planes of the cutting insert. The planes may be parallel and each plane may touch at least two, preferably three or four, corner portions of the upper and lower surface of the cutting insert, respectively.

Figure 2A:
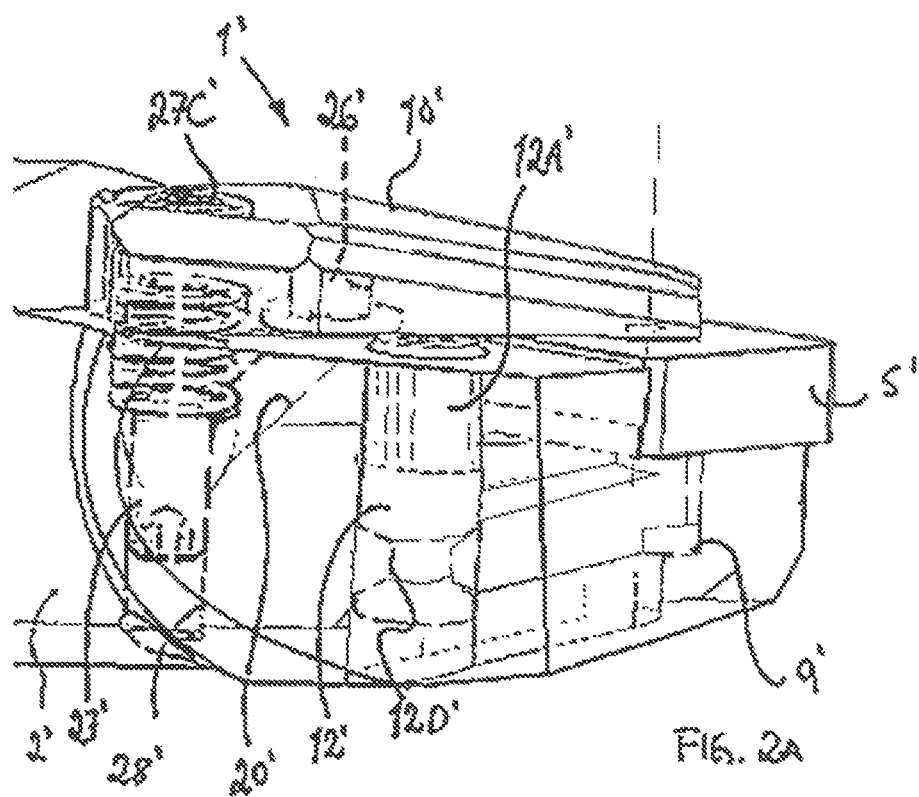
FIG. 2A is a perspective side view of a cutting tool according to an aspect of the present invention.
Figure 2B:
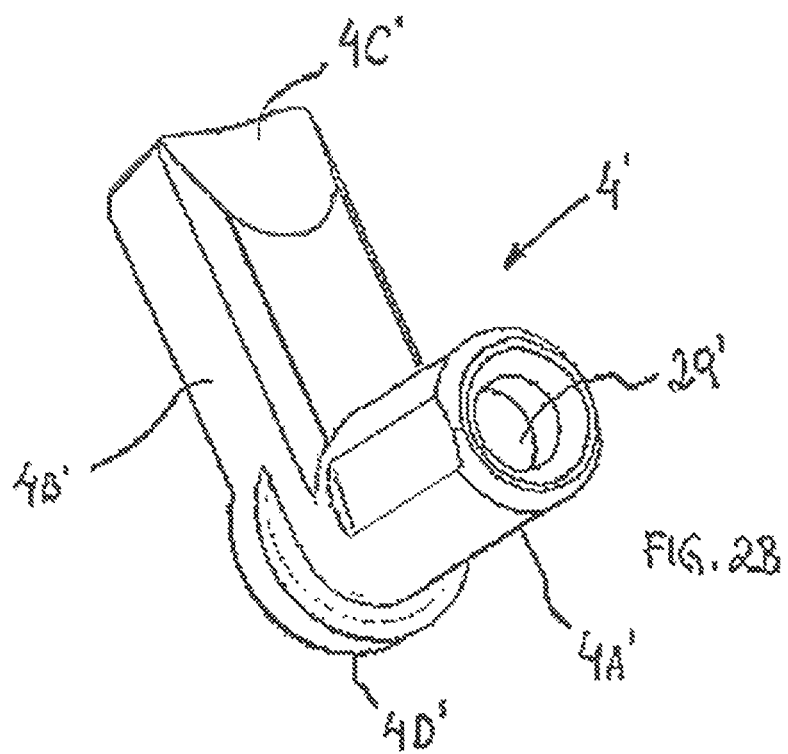
FIG. 2B is a perspective view of a lever shown in FIG. 2A.
Figure 2E:
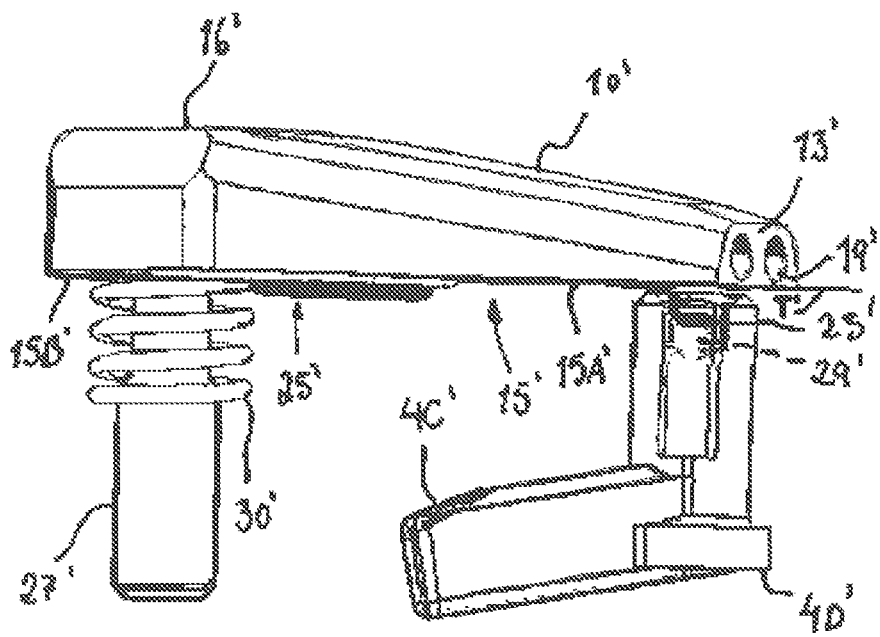
FIG. 2E is a perspective side view of the nozzle, the spring, the fastening means and the lever shown in FIG. 2A.
Figures 2F, 2G:
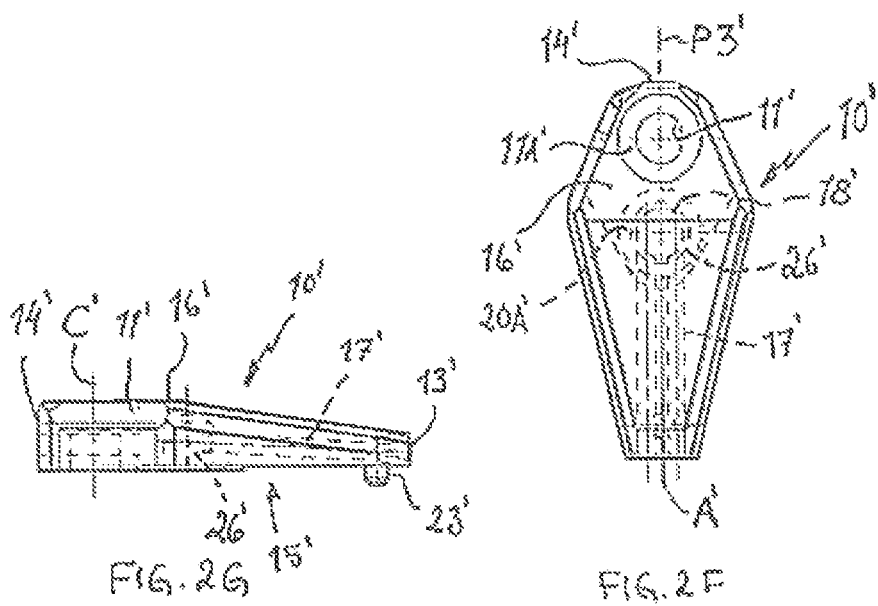
FIG. 2F is a top view of the nozzle.
FIG. 2G is a side view of the nozzle.
Figure 2H:
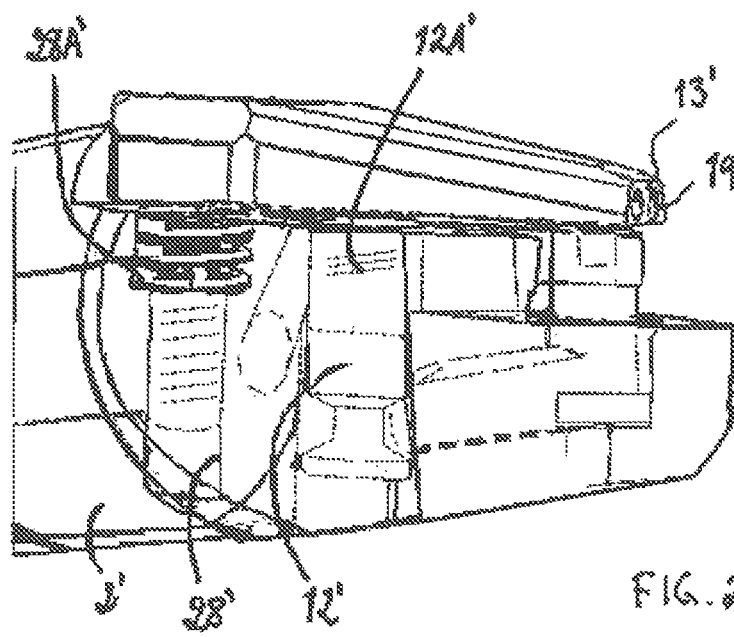
FIG. 2H is a perspective side view of the cutting tool in FIG. 2A without a cutting insert.
Figure 2I:
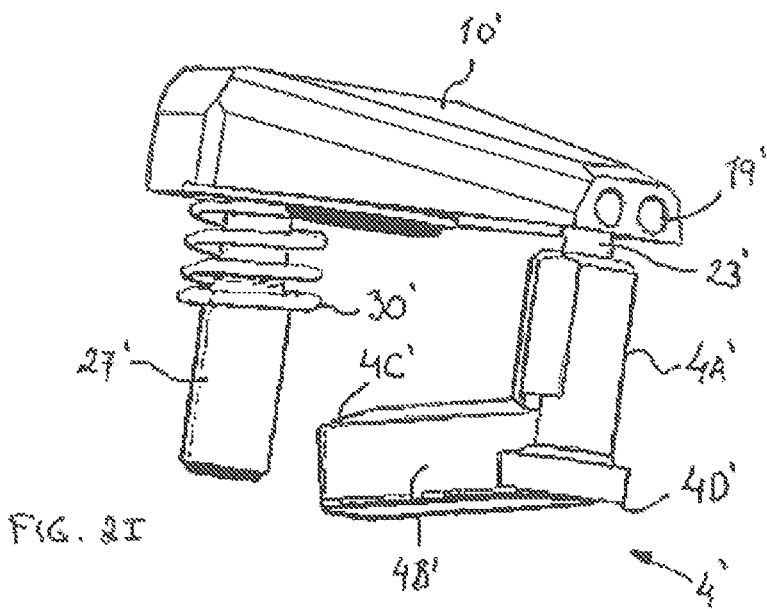
FIG. 2I is a perspective front view of the nozzle and the lever.
Figure 2J:
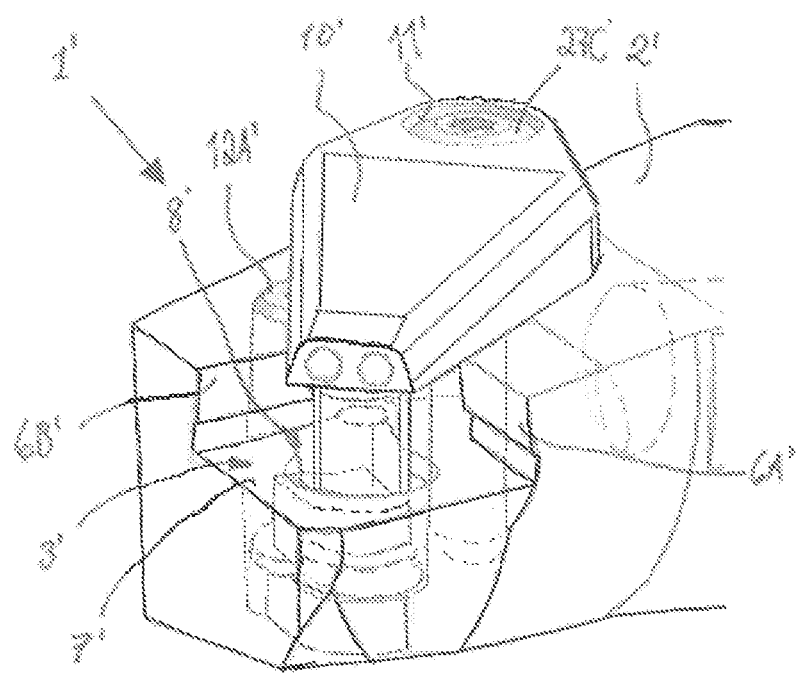
FIG. 2J is a perspective front view of the cutting tool in FIG. 2A without a cutting insert.
Figure 2K:
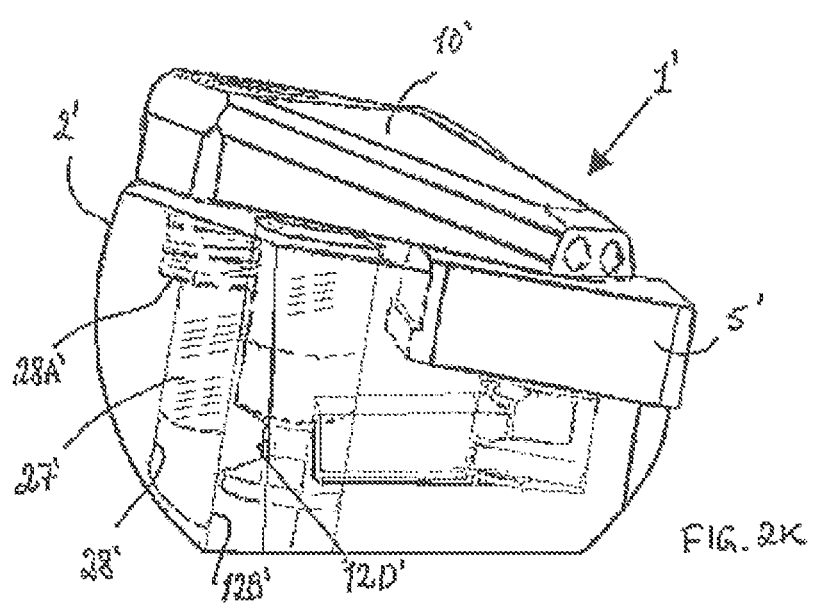
FIG. 2K is a perspective front view of the cutting tool in FIG. 2A.
Figure 2L:
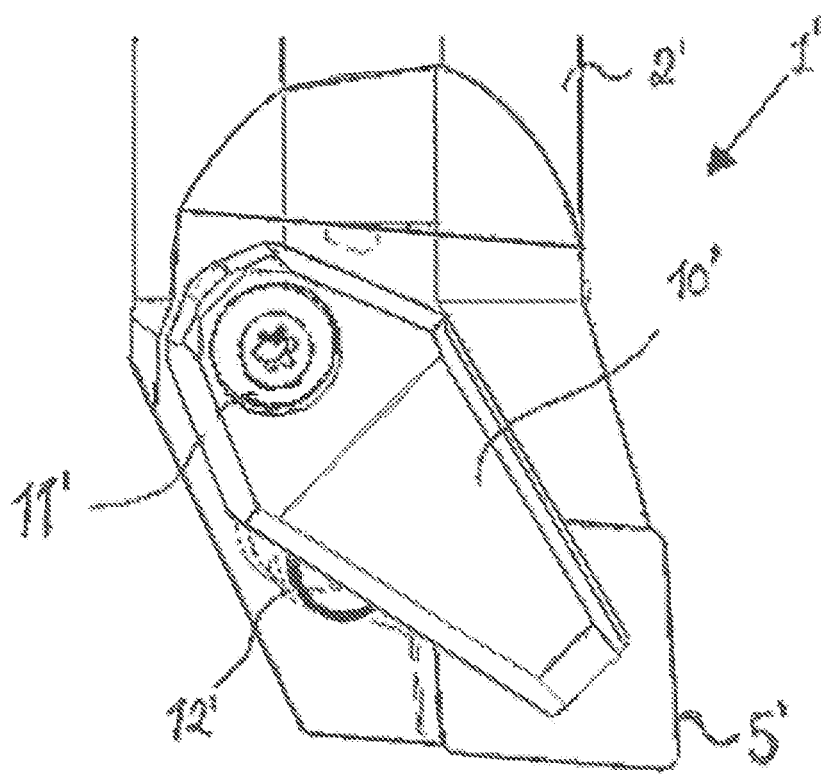
FIG. 2L is a top view of the cutting tool in FIG. 2A.

The nozzle 10' may exhibit mirror symmetry about a first plane P3' containing a longitudinal axis A' of the nozzle as can be seen, for example, in FIG. 2F. The nozzle may be a one-piece unit. The nozzle includes a forward end 13', a rear end 14' and a bottom face 15'. The bottom face 15' comprises a first surface 15A' and a second surface 15B', the first surface being generally recessed relative to the second surface. A single through hole 11' extends between the bottom face 15' and an opposite top face 16'. At least one internal coolant channel 17' is provided in the nozzle that extends from a first opening 18' to a second opening 19', and preferably has no strength reducing or plugged holes such as stop screws in holes. The first opening 18' is connectable to the coolant supply conduit 20' in the holder body. The first opening 18' is located at the second surface 15B' of the bottom face 15'. The second surface 15B' projects such that a tangent T' to the first surface 15A' facing the cutting insert 5', and perpendicular to a through hole axis intersects the first opening or the channel 17. The first opening 18' is positioned between the through hole 11' and the forward end 13' and may comprise a chamber 26' in flow communication with the second opening 19'. The second opening 19' serves as exit for the coolant at the forward end 13'. The at least one coolant channel 17' and the first opening 18' are spaced from, i.e. not in contact with the through hole 11. The at least one coolant channel 17' may follow a smooth path without sudden directional changes such that coolant flow is not obstructed. The channel may be straight or have a path that resembles the one of above-captioned channel 17. The single through hole 11' may be surrounded by an enlarged cavity 11A' at the top face 16.

The nozzle 10' may be made through conventional machining, precision casting or additive manufacturing such as selective laser sintering (SLS).

The nozzle 10' can be held to the holder body 2' by a screw member 27'. The single through hole 11' is countersunk and receives the screw member 27' which is threadedly secured to a hole 28' in the holder body. The screw member 27' may have a head 27C' which has an underside that can act on a cavity bottom 11B' in the through hole 11'. The hole 28' has an enlarged portion 28A' to accommodate a spring 30', such as a helical compression spring.

The bottom face 15' of the nozzle comprises a guide device 23', such as a projection or recess, close to or at the forward end 13' to direct the nozzle and thereby direct a coolant jet by having the guide device releasably cooperating with a recess or projection on a cutting insert or at a clamping means such as the locking member 4'. The nozzle has a guide device such as a projection 23' adjacent the forward end 13' to preferably loosely engage the recess 29' of the locking member 4'. The projection 23' may be part of the forward end 13' or spaced from it by a distance that is less than a half length of the nozzle. Preferably the projection is formed close to the forward end like in for example FIG. 2G for best guidance of the coolant.

The coolant is led through conduits passing through the holder body 2' and requires connecting passageways and a deformable seal element 25' to lead the coolant to the discharge exit 19'. The seal element 25', such as an O-ring may be secured to or be loosely held by the nozzle or be secured to or be loosely held by the holder body.

At mounting of the cutting insert 5' to the holder body 2' the locking member 4' sits in the recess 8' by interaction of the rim 4D' and the ledge 9' in a conventional manner. The screw 12A' is passed through the nozzle hole 11' and threaded through the hole 12B' in the holder body 2'. In a similar way as described in connection with the previous embodiment of the invention (i.e. the free end of the screw 12A) the waist portion 12D' of the screw 12A' will bring the leg 4B' and thereby cause pivotal movement of the leg 4A'. If a cutting insert 5' is mounted in the pocket 3' the leg 4A' will urge the cutting insert in direction towards the upstanding walls 6A' and 6B'. Also, the screw head 27C' will act on the cavity 11' bottom and force the nozzle against the spring means 30 in direction towards the holder body. By choosing the correct direction of the nozzle, i.e. such that the projection 23' is aligned with the hole 29' usually such that the axis A' maybe coincides with a cutting insert corner bisector, the nozzle will become clamped against the holder body via the interaction of the seal 25' and the concave cavity 20A' and guided by the projection 23'/recess 29' interface. The nozzle is thereby provided with means to guide it into a desired direction. Of course the projection 23' is shorter than the depth of the hole 29' for the coolant sealing to be effective. Guidance can be achieved in other ways too, such as at least one protrusion in the forward end of the nozzle acting substantially centrally on the cutting insert. The nozzle bottom face 15A' is spaced from, i.e. not in contact with the cutting insert 5' in assembled state. The nozzle in this embodiment is not meant to clamp on the cutting insert since there is a gap between the cutting insert and the bottom face 15', but can do so. In the latter case the projection can be elastic or resilient to allow sealing although the projection is in contact with a locking member or cutting insert.

In use the shown tool will be turning metal workpieces while coolant may flow in order through the holder body 2', the coolant supply conduit 20', the seal 25', the fluid channel 17' and from the exit 19' towards at least one active cutting edge.

Reference is now made to FIGS. 3A-3F showing a cutting tool 1" in accordance with the present invention. The shown cutting tool 1" may be a turning tool for internal metal machining and comprises a holder body 2" having a pocket 3", a clamping means in the shape of a locking member 4" and an inducer or nozzle 10. The pocket 3" is conventional and may have a bottom surface and two upstanding walls as discussed previously. The bottom surface is provided with a removable shim. The indexable cutting insert 5" is clamped in the pocket by means of nozzle 10" gripping into a hole of the cutting insert. In the illustrated embodiment, the cutting insert is generally diamond in shape. The nozzle 10" is intended to urge the converging sides of the cutting insert 5" against the upstanding walls, which are of substantially complementary shape to the sides of the cutting insert. Actuating means or fastening means 12" is provided to move the nozzle 10" along a path depicted by line C-C in FIG. 3A. In the illustrated embodiment, the means 12" is in the form of a screw 12A" threadably engaged in a hole 12B" in the holder 2".

Figure 3A:
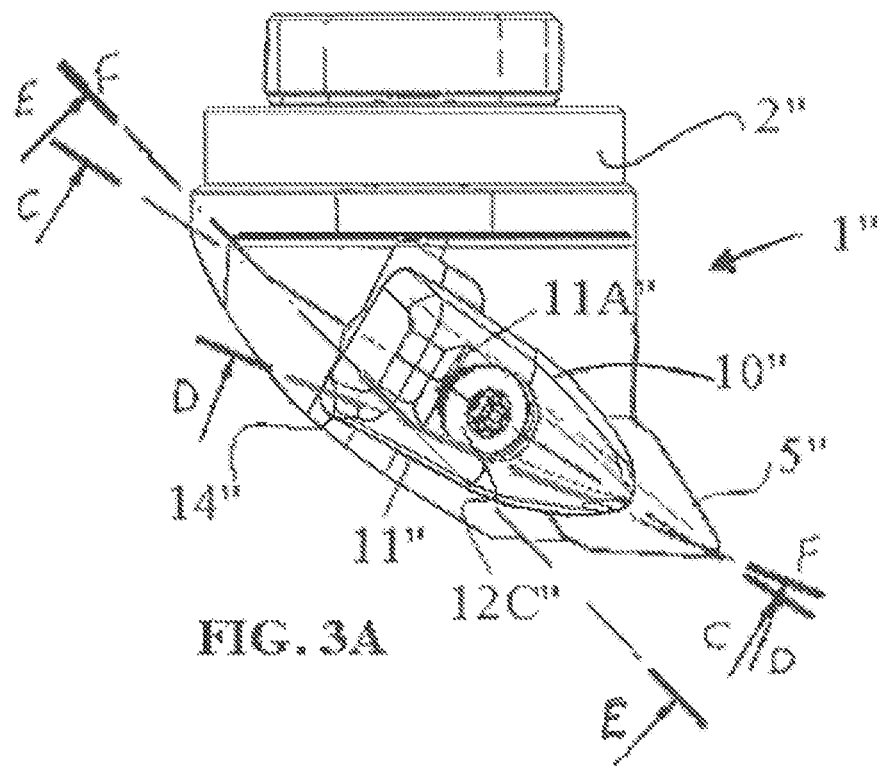
FIG. 3A is a top view of a cutting tool according to an aspect of the present invention.
Figure 3B:
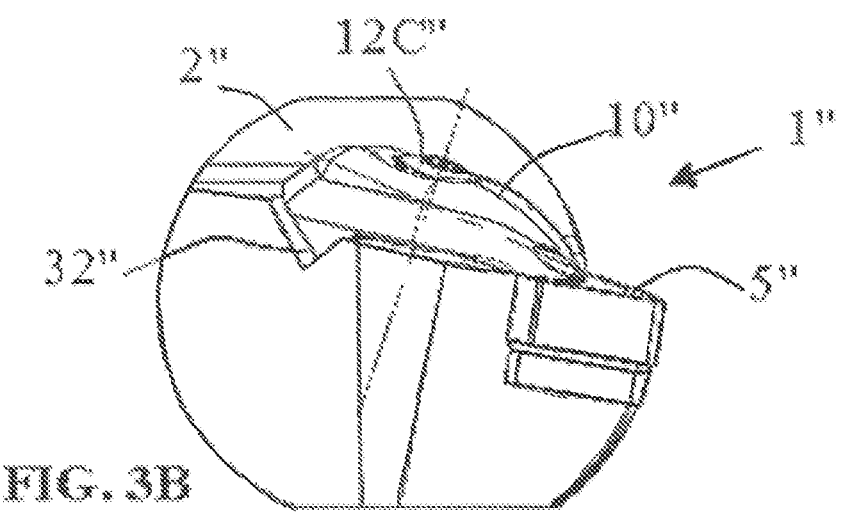
FIG. 3B is a front view of the cutting tool in FIG. 3A.
Figure 3E:
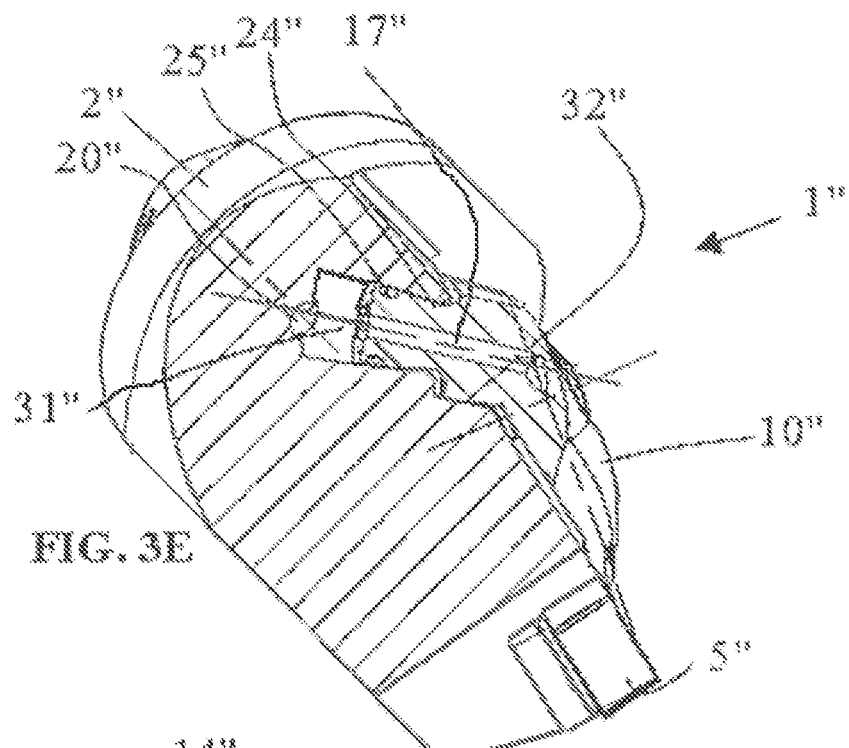
FIG. 3E is a cross-sectional view along line E-E in FIG. 3A.
Figure 3F:
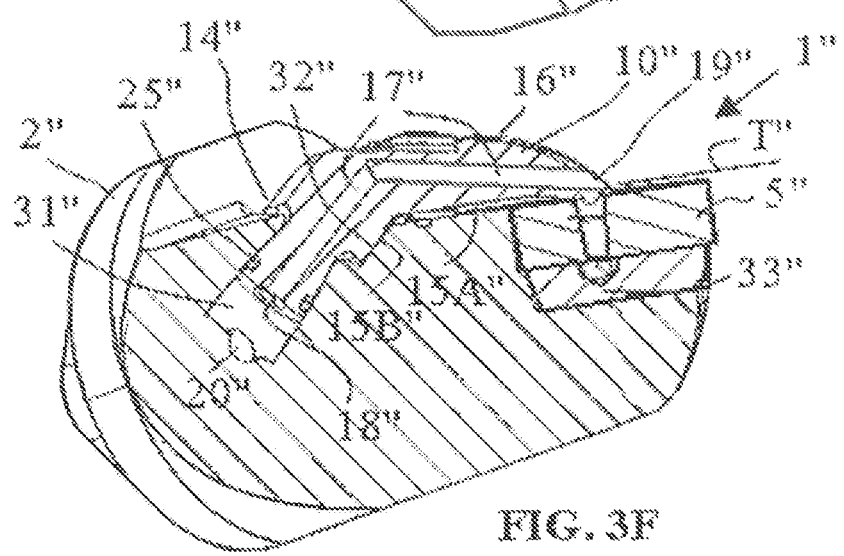
FIG. 3F is a cross-sectional view along line F-F in FIG. 3A.

The holder body 2" is provided with a concave or V-shaped cavity 32" whose bottom may be perpendicular to the axis or line C-C in FIG. 3A which line may coincide with a bisector of an active cutting corner of the cutting insert. The cavity 32" is provided at a distance from the pocket 3". A guide hole 31" intersects the cavity 32". The guide hole 31" may be cylindrical and is in flow communication with a coolant supply conduit 20" extending in the holder body. The threaded hole 12B" is provided between the cavity and the pocket. The guide hole 31" has a central axis that forms an acute angle with a central axis of the cutting insert hole. Said angle is between 35 and 50 degrees. The guide hole central axis forms an even acuter angle with a central axis of the threaded hole 12B". Said angles are measured in the plane corresponding to FIG. 3C.

The nozzle 10" exhibits mirror symmetry about a first plane containing a longitudinal axis C-C of the nozzle. The nozzle may be a one-piece unit. The nozzle includes a forward end 13", a rear end 14" and a bottom face 15". The bottom face 15" comprises a first surface 15A" and a second surface 15B, the first surface being generally recessed relative to the second surface. As best seen in FIG. 3C, the bottom face 15" of the forward end 13" of the nozzle 10" includes a lip portion 33" to be held in engagement with the hole of the cutting insert 5" in a conventional manner.

A single through hole 11" extends between the bottom face 15" or partly from both the first and second surfaces 15A" and 15B" and an opposite top face 16". The second surface 15B" may have a shape that is complementary to a leg of the V-shaped cavity closest to the cutting insert. The single through hole 11" is non-cylindrical by having an elongated or oval cross-section to allow perpendicular movement of the through hole 11" relative to the screw 12". The single through hole 11" may be surrounded by an enlarged cavity 11A" at the top face 16". At least one internal coolant channel 17" is provided in the nozzle that extends from a first opening 18" to a second opening 19", and is preferably not having any strength reducing or plugged holes such as stop screws in holes. The first opening 18" is connectable to the coolant supply conduit 20" in the holder body. The rear end 14" of the nozzle connects to a heel protrusion 24" carrying the first opening 18" at a free end thereof. The first opening 18" is located at a portion or second surface 15B" of the bottom face 15". In the shown embodiment there are two openings 18" at the free end. The heel protrusion 24" is preferably cylindrical and has a circumferential groove to receive a seal element 25" such as an O-ring. The diameter of the heel protrusion 24" is slightly less than the diameter of the guide hole 31" to allow entry therein while the seal element becomes compressed. The heel protrusion 24" has an axis that forms an acute angle with a central axis of the cutting insert hole. Said angle is between 35 and 50 degrees. The heel protrusion axis forms an even acuter angle with a central axis of the though hole 11". Said angles are measured in the plane corresponding to FIG. 3C.

The second surface 15B" projects such that a tangent T" (FIG. 3F) to the first surface 15A" facing the cutting insert 5", and perpendicular to a cutting insert through hole axis intersects the channel 17" and usually also the heel projection 24". The first opening 18" may comprise a chamber (not shown) in flow communication with the second opening 19" similar to the one discussed above. The second opening 19" serves as exit for the coolant at the forward end 13". The at least one coolant channel 17" and the first opening 18" are spaced from, i.e. not in contact with the through hole 11". The at least one coolant channel 17" is shown as comprising two straight portions in for example FIG. 3F but may follow a smooth path without sudden directional changes such that coolant flow is not obstructed as discussed before to reduce the risk for oil traps. The nozzle 10" may be made through conventional machining, precision casting or additive manufacturing or any combination thereof.

The screw 12A" may have a single threaded end portion and may have a key grip at each end or only one end. The lip portion 33" extends into the central hole in the cutting insert and serves to detachably secure the cutting insert in the pocket 3. The movement of the nozzle causes the cutting insert 5" to move towards the upstanding pocket walls and a shim 35" or the pocket bottom surface and be clamped thereto. The screw 12A" may extend along a hole 12B" in the holder body 2". The screw is intersected by upper (P1) and lower (P2) imaginary planes of the cutting insert. The planes P1 and P2 may be parallel and each plane may touch at least two, preferably three or four, corner portions of the upper and lower surface of the cutting insert, respectively.

The nozzle 10" can be held to the holder body by the fastening member 12", preferably by the single screw 12A". The single through hole 11" receives the fastening member 12" which may have a cross-sectional restriction below the tangent T" to form a seat for a clip 34", the latter functioning to lift the nozzle during unscrewing of the screw 12A".

At initial assembly of the tool 1" the cutting insert 5" is positioned in the pocket of the holder body 2" in a conventional manner. The screw 12A" is passed through the nozzle hole 11" and the clip 34" is secured to the restriction below the nozzle. The screw 12A" is pushed backward along the elongated through hole 11" such that the screw 12A" and the heel projection may enter the guide hole 31" and the hole 12B", respectively, and the lip portion 33" is aligned in the cutting insert hole. The screw 12A" is then tightened in the hole 12B" of the holder body 2. The screw head 12C" will act on the cavity 11A" bottom and force the nozzle in two directions towards the holder body defined by the guide hole 31" axis and the hole 12B" axis, respectively. The screw head 12C" will slide on the cavity 11A" bottom towards the forward end of the elongated hole 11" while the cutting insert is being clamped. The second surface 15B" and the heel projection may cooperate with the V-shaped cavity 32" and the guide hole 31" to create the pull of the nozzle. The cutting insert will thus become clamped in the pocket. When indexing a new cutting edge or new cutting insert the screw 12A" need not be fully unscrewn just enough to give space to manipulate the cutting insert. The coolant is led through conduits passing through the holder body and requires connecting passageways to lead the coolant to the discharge exit 19". The array of conduits is not interrupted at indexing of the cutting insert.

In use the shown tool will be turning metal workpieces while coolant may flow in order through the holder body 2", the coolant supply conduit 20", the fluid channel 17" and from the exit 19" to at least one active cutting edge.

Stated another way, a single fastening member 12" or screw 12A" secures both the cutting insert 5" and the nozzle 10".

Tool life generally increases with increase in coolant supply pressure. This can be attributed to the ability of the high-pressure coolant to lift the chip and gain access closer to the cutting interface. This action leads to a reduction of the seizure region, thus lowering the friction coefficient, which in turn results in reduction in cutting temperature and cutting forces. Preferably the pressure used in the discussed embodiments is above 30 bar, preferably above 100 bar coolant pressure.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such. Terms such as "upper", "lower", "top", "bottom", "forward" and "rear" refer to features as shown in the current drawings and as perceived by the skilled person.

While this invention has been illustrated and described in accordance with a preferred embodiment, it is recognized that variations and changes may be made therein without departing from the invention as set forth in the claims.

The disclosures in EP Patent Application Nos. 15174661.7 and 15174654.2, from which this application claims priority, are incorporated herein by reference.

The invention claimed is:

1. A tool comprising:
 a holder body;
 a cutting insert; and
 a nozzle, said nozzle having a single through hole arranged to receive a fastening member, said nozzle having a forward end, a rear end and a bottom face, said through hole extending between the bottom face and an opposite top face, two internal coolant channels provided in the nozzle and extending from a first opening to a second opening, said first opening connecting to a coolant supply conduit in the holder body, said second opening serving as exit for the coolant at the forward end, wherein the two internal coolant channels and the first opening are spaced from the through hole, wherein the two internal coolant channels extend at opposite sides of the through hole.

2. The tool according to claim 1, wherein the first opening is located at a portion or second surface of the bottom face, said portion projecting such that a tangent to the bottom face facing the cutting insert and perpendicular to a through hole axis intersects the first opening or the at least one internal coolant channel.

3. The tool according to claim 1, wherein the nozzle is a removable nozzle for turning applications and wherein the tool includes a seal element arranged to coolant-tightly seal the nozzle relative to the holder body.

4. The tool according to claim 1, wherein the at least one internal coolant channel follows a smooth path without sudden directional changes.

5. The tool according to claim 4, wherein at least a first portion of the at least one internal coolant channel transits mathematically smooth into a second portion of the coolant channel, such that the first and second portions of the coolant channel are continuous.

6. The tool according to claim 1, wherein the first opening is situated between the through hole and the rear end.

7. The tool according to claim 1, wherein the first opening is situated between the through hole and the forward end.

8. The tool according to claim 1, wherein the bottom face of the nozzle includes a guide device adjacent to the forward end to set the direction of the nozzle by having the guide device cooperating with a recess or projection on a cutting insert or clamping means.

9. The tool according to claim 1, wherein the rear end connects to a cylindrical heel protrusion carrying the first opening.

10. The tool according to claim 1, wherein the at least one internal coolant channel or the first opening is surrounded by a seal.

11. The tool according to claim 1, wherein the nozzle is a one-piece unit.

12. The tool according to claim 1, wherein the fastening member is a screw which extends along a hole in the holder body, said screw being intersected by upper and lower imaginary planes of the cutting insert.

13. The tool according to claim 1, wherein the nozzle bottom face is spaced from the cutting insert in an assembled state.

14. The tool according to claim 1, wherein the nozzle is arranged as a clamp pressing against a part of the cutting insert.

15. The tool according to claim 1, wherein a single fastening member or screw secures both the cutting insert and the nozzle.

* * * * *